United States Patent
Hotta et al.

(10) Patent No.: US 9,199,537 B2
(45) Date of Patent: Dec. 1, 2015

(54) AUTOMOBILE WITH VEHICLE DRIVE MOTOR

(75) Inventors: Koji Hotta, Miyoshi (JP); Kenshi Yamanaka, Nukata-gun (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 14/114,433

(22) PCT Filed: Jul. 26, 2011

(86) PCT No.: PCT/JP2011/066910
§ 371 (c)(1),
(2), (4) Date: Oct. 28, 2013

(87) PCT Pub. No.: WO2013/014745
PCT Pub. Date: Jan. 31, 2013

(65) Prior Publication Data
US 2015/0021114 A1    Jan. 22, 2015

(51) Int. Cl.
*B60L 3/00* (2006.01)
*B60R 16/04* (2006.01)
(Continued)

(52) U.S. Cl.
CPC .......... *B60L 3/0007* (2013.01); *B60K 1/00* (2013.01); *B60K 1/04* (2013.01); *B60L 3/0046* (2013.01); *B60L 3/0053* (2013.01); *B60L 3/0069* (2013.01); *B60L 3/04* (2013.01); *B60L 11/1803* (2013.01); *B60L 11/1868* (2013.01); *B60L 11/1877* (2013.01); *B60L 11/1879* (2013.01);
(Continued)

(58) Field of Classification Search
CPC ... B60R 16/04; B60L 3/0007; B60L 11/1877; B60L 11/1879; B60L 2270/00
USPC ........ 180/271, 274, 279, 291, 68.5; 296/187.03, 187.09, 187.1
See application file for complete search history.

(56) References Cited

U.S. PATENT DOCUMENTS 5,932,932 A * 8/1999 Agatsuma et al. ........ 307/10.6
6,460,642 B1 * 10/2002 Hirano .................... 180/65.1
(Continued)

FOREIGN PATENT DOCUMENTS

CN   101548412 A   9/2009
EP   2186686 A1    5/2010
(Continued)

OTHER PUBLICATIONS

English Translation of a Communication dated Jul. 10, 2014 from the German Patent Office in counterpart for the German application No. 112011105463.7.

*Primary Examiner* — Ruth Ilan
*Assistant Examiner* — Barry Gooden, Jr.
(74) *Attorney, Agent, or Firm* — Sughrue Mion, PLLC (57) ABSTRACT

A technology for mitigating a collision impact applied to a power controller positioned in a front compartment is provided. An automobile has a power controller and device in the front compartment. The power controller and the device are positioned side by side in an automobile lateral direction. A corner or protrusion of the power controller faces a lateral surface of the device. When the automobile collides with an obstacle, the lateral surface of the device comes into contact with the corner of the power controller. Because the lateral surface of the device is weaker than the corner of the power controller, the device breaks first. The device functions as a cushioning material to mitigate damage suffered by the power controller.

9 Claims, 8 Drawing Sheets

(51) Int. Cl.
*B60K 1/00* (2006.01)
*B60L 3/04* (2006.01)
*B60L 11/18* (2006.01)
*B60K 1/04* (2006.01)

(52) U.S. Cl.
CPC ......... *B60L11/1883* (2013.01); *B60L 11/1896* (2013.01); *B60L 11/1898* (2013.01); *B60R 16/04* (2013.01); B60K 2001/0411 (2013.01); B60L 2210/40 (2013.01); B60Y 2306/01 (2013.01); Y02T 10/7066 (2013.01); Y02T 10/7241 (2013.01); Y02T 90/34 (2013.01)

(56) References Cited

U.S. PATENT DOCUMENTS

| | | | |
|---|---|---|---|
| 6,827,168 | B2 | 12/2004 | Miyazaki |
| 7,485,983 | B2* | 2/2009 | Asao et al. .................. 307/10.1 |
| 7,766,113 | B2* | 8/2010 | Yamafuji .................... 180/68.5 |
| 7,802,643 | B2* | 9/2010 | Yajima ...................... 180/65.22 |
| 7,913,786 | B2* | 3/2011 | Voigt et al. ................. 180/68.5 |
| 8,336,657 | B2* | 12/2012 | Dobbins et al. ............. 180/68.5 |
| 8,365,858 | B2* | 2/2013 | Tamagawa et al. ........... 180/291 |
| 8,479,867 | B2* | 7/2013 | Fukazu et al. ............... 180/291 |
| 8,698,347 | B2* | 4/2014 | Ishigaki ........................ 307/9.1 |
| 8,720,976 | B2* | 5/2014 | Oyama et al. ............ 296/187.09 |
| 8,739,910 | B2* | 6/2014 | Katayama et al. ........... 180/68.5 |
| 8,893,843 | B2* | 11/2014 | Hayano ........................ 180/232 |
| 2002/0191385 | A1 | 12/2002 | Miyazaki |
| 2003/0117728 | A1* | 6/2003 | Hutzel et al. .................. 359/838 |
| 2005/0205316 | A1* | 9/2005 | Yamafuji .................... 180/68.5 |
| 2007/0161455 | A1* | 7/2007 | King et al. ........................ 477/3 |
| 2008/0011528 | A1* | 1/2008 | Verbrugge et al. ........... 180/65.2 |
| 2008/0078597 | A1* | 4/2008 | Voigt et al. .................. 180/68.5 |
| 2008/0149410 | A1 | 6/2008 | Yang et al. |
| 2009/0173564 | A1* | 7/2009 | Elbert et al. .................. 180/291 |
| 2009/0213564 | A1* | 8/2009 | Kakuda et al. ................. 361/811 |
| 2009/0236162 | A1 | 9/2009 | Takasaki et al. |
| 2011/0139595 | A1* | 6/2011 | Ishigaki ...................... 200/52 R |
| 2011/0162902 | A1* | 7/2011 | Dobbins et al. .............. 180/68.5 |
| 2012/0055724 | A1* | 3/2012 | Iwasa et al. .................. 180/68.5 |
| 2012/0112537 | A1* | 5/2012 | Fukazu et al. ................. 307/10.1 |
| 2013/0270862 | A1* | 10/2013 | Hotta et al. .............. 296/187.09 |
| 2014/0015492 | A1 | 1/2014 | Namou et al. ................. 320/136 |
| 2014/0097641 | A1* | 4/2014 | Hayano .................... 296/187.09 |
| 2014/0151138 | A1* | 6/2014 | Kitami et al. ............. 180/65.21 |
| 2014/0345960 | A1* | 11/2014 | Yamanaka et al. ........... 180/65.8 |
| 2015/0057865 | A1* | 2/2015 | Stadler et al. ................... 701/22 |
| 2015/0107920 | A1* | 4/2015 | Sakamoto .................. 180/65.31 |

FOREIGN PATENT DOCUMENTS

| | | |
|---|---|---|
| JP | 2001-354040 A | 12/2001 |
| JP | 2002-362254 A | 12/2002 |
| JP | 2008-150026 A | 7/2008 |
| JP | 2009-090818 A | 4/2009 |
| JP | 2010-137827 A | 6/2010 |
| JP | 2011-020628 A | 2/2011 |
| JP | 2011020602 A | 2/2011 |
| JP | 2011-084198 A | 4/2011 |

* cited by examiner

AUTOMOBILE WITH VEHICLE DRIVE MOTOR

CROSS REFERENCE TO RELATED APPLICATIONS

This application is a National Stage of International Application No. PCT/JP2011/066910 filed Jul. 26, 2011, the contents of all of which are incorporated herein by reference in their entirety.

TECHNICAL FIELD

The present invention relates to an automobile provided with a vehicle drive motor (motor for vehicle running). The present invention particularly relates to an electric automobile, including a hybrid vehicle. The term "automobile" described in the present specification includes a fuel cell vehicle.

DESCRIPTION OF RELATED ART

Various devices such as an engine, a motor, and a controller thereof are mounted in a front compartment (engine compartment) of an automobile. The devices inside the front compartment are likely to suffer serious damage when the automobile collides with an obstacle. Various technologies are proposed for mitigating damage suffered by the devices due to the collision, by improving the arrangement of the devices or the support structure of each device.

Patent document 1 discloses an automobile in which a relay box positioned at the back of a battery is pushed out of a front compartment by an impact of a collision. This technology ensures a space in which the battery can move by releasing the relay box at the time of the collision. The collision impact can be absorbed by allowing the battery to move freely at the time of the collision.

Patent document 2 discloses a technology for suppressing damage to an inverter inside a front compartment at the time of a collision. The technology disclosed in Patent document 2 allows the inverter to move with a collision impact. The technology disclosed in Patent document 2 reduces the impact caused by the collision between the inverter and other parts by allowing the inverter to move freely at the time of the collision. The inverter is an essential component in electric automobiles and hybrid vehicles and therefore needs to be protected especially from the collision.

Prior Art Documents

Patent document 1: Japanese Patent Application Publication No. 2002-362254
Patent document 2: Japanese Patent Application Publication No. 2009-90818

BRIEF SUMMARY OF INVENTION

The technologies disclosed in Patent documents 1 and 2 mitigate the damage suffered by the devices, by allowing the devices to move freely. The technology disclosed in Patent document 1, however, needs a mechanism for pushing the relay box out of the front compartment. The technology disclosed in Patent document 2 normally fixes the inverter tightly but needs a mechanism for allowing the inverter to move feely when being subjected to the impact. A special mechanism is required in both technologies, resulting in higher costs. The technology disclosed in the present specification is based on a concept completely different from those of the technologies disclosed in Patent documents 1 and 2, and is a technology for protecting devices mounted in a front compartment, especially a power controller which is essential to an automobile with a drive motor.

A power controller of an automobile supplies electric power to a vehicle drive motor. In other words, the power controller handles large electric power supplied to the vehicle drive motor. Therefore, the power controller needs to release remaining electric power immediately after the automobile collides with an obstacle. Specifically, the power controller uses a large capacitor for smoothing a motor drive current. It is preferred that, when the automobile collides with the obstacle, the power controller survives the impact of the collision and discharges the large capacitor immediately. It is also preferred that, when the automobile is a fuel cell vehicle, the power controller immediately release electric energy generated by the fuel cell. As long as the power controller can survive the impact of the collision (for at least a few seconds after the collision), the capacitor (or the fuel cell) can be discharged by an emergency discharge circuit. In so doing, the damage suffered by the power controller at the time of the collision of the automobile needs to be reduced.

The technology disclosed in the present specification provides a device layout inside a front compartment in which, when a power controller collides with another device, the other device is more likely to break than the power controller. The technology disclosed in the present specification focuses on a case of the power controller. The case is a polyhedron (typically a hexahedron) with corners. The corners have a higher strength than flat surfaces of the polyhedron. Therefore, in case of the collision of the automobile, even when the other device might break down, the chance that the power controller survives can be increased by positioning the power controller and the other device such that one of the corners of the power controller collides with a flat surface of the other device. A similar advantage can be obtained by providing the case of the power controller with a protrusion and positioning the power controller and the other device such that the protrusion faces the flat surface of the other device. This layout can reduce the impact applied to the power controller. The technology disclosed in the present specification can reduce the impact applied to the power controller without requiring any special mechanism.

Hereinafter, a device other than the power controller is simply referred to as a "device" for simplification. In embodiments of the technology disclosed in the present specification, the device (the device other than the power controller) is positioned diagonally to the front of the power controller in the front compartment. Furthermore, the power controller and the device are positioned such that a corner or protrusion of the power controller faces a flat lateral surface of the device. Such a layout brings out the following advantages. First of all, when the automobile employing the technology disclosed in the present specification collides with an obstacle (e.g., another automobile) head on, the device collides with the obstacle before the power controller does. The device might break down, but the impact of the collision is absorbed. As a result, the impact applied to the power controller can be mitigated. Furthermore, when the obstacle collides with the automobile obliquely from the front, the device is pushed and moved by the obstacle and comes into contact with the power controller. At this moment, the flat lateral surface of the device collides with the corner or protrusion of the power controller. The flat lateral surface is more likely to be dented than the corner or protrusion. In other words, when the power controller collides with the device, the lateral surface of the device collapses first. Because the device collapses between the power controller and the obstacle, the impact applied to the power controller can be mitigated. The technology disclosed in the present specification can reduce the damage to the power controller by employing a positional relationship where the device breaks easily between the power controller and the obstacle. The technology disclosed in the present specification does not need a special mechanism which requires additional cost.

The device (the device other than the power controller) is typically a battery that supplies electric power to the power controller (a battery that supplies electric power for driving an electric circuit of the power controller). Most of the batteries supplying electric power to power controllers have plastic cases (usually the case of the power controller is made of metal). Moreover, a lateral surface of each plastic case is flat. Therefore, the plastic cases are softer than the case of the power controller, and the battery with the flat lateral surface is suitable as a cushioning material for mitigating the damage to the power controller. Note that the power controller handles higher voltage than the battery supplying electric power to the power controller and therefore can be categorized as "a high-voltage device." On the contrary, the battery that supplies electric power to the electric circuit in the controller can be categorized as "a low-voltage device." The term "high-voltage device" used in the present specification means a device that uses a voltage exceeding 50 V and "low-voltage device" means a device that handles a voltage below 50 V. The voltage "50 V" is merely an indication for distinguishing between "high-voltage device" and "low-voltage device," and an indication for distinguishing therebetween is not limited thereto. Additionally, the device that protects the power controller is not limited to the battery. For example, a relay box, an air-conditioner compressor and the like can be candidates for such a device.

The above has described the principle of the invention disclosed in the present specification. A further improvement of the present invention will be described in embodiments of the present invention.

DETAILED DESCRIPTION OF INVENTION

First, a group of devices and a power controller that are mounted in a front compartment are described. The power controller of a vehicle drive motor is one of the most important devices mounted in the front compartment. The power controller controls electric power supplied to the vehicle drive motor (electric power itself is supplied from a large-capacity battery to the power controller). Therefore, the power controller handles large electric power. The electric power handled by the controller is preferably discharged immediately after a collision. Also, because a fuel cell generates hydrogen, the hydrogen is preferably released immediately after the collision. The term "vehicle drive motor" is simply referred to as "motor," hereinafter, for simplification.

In order to drive the high-power motor, the power controller uses a capacitor as a current smoothing filter. The capacitor for smoothing the current for driving the motor has a large capacitance with a total of approximately 100 farads or more. When a large amount of electric power remains stored in the capacitor after the collision, electric leakage might occur. The power controller, therefore, preferably has an emergency discharge circuit (this may include a discharge resistance) for discharging the capacitor. As long as the power controller can survive even for a short period of time after the collision, activation of the emergency discharge circuit can prevent the electric leakage. For this reason, it is important to suppress damage to the power controller at the time of the collision.

Furthermore, a battery is positioned in the front compartment. This battery is a power source for driving an electric circuit, headlamp, interior light, power window motor, windshield wiper motor, and the like. In a hybrid vehicle or an electric automobile, the battery that supplies electric power to the electric circuit and the like is referred to as an auxiliary battery or an accessory battery in order to be distinguished from the large-capacity battery (including the fuel cell) that supplies electric power to the motor (vehicle drive motor). The large-capacity battery that supplies the electric power to the motor supplies electric power exceeding approximately 50 V. The battery that supplies the electric power to the electric circuit and the like supplies electric power of less than approximately 50 V. Hereinafter, in the present specification, the battery that supplies the electric power for diving the motor is referred to as a "main battery," and the battery that supplies the electric power to the electric circuit and the like is simply referred to as a "sub-battery" or "battery". The sub-battery is often positioned in the vicinity of the above-mentioned power controller. This is because the power controller, the important device, is preferably closer to the sub-battery than the other device is, because the electric circuit provided within the power controller is also supplied with electric power from the sub-battery. Positioning the power controller and the sub-battery adjacent to each other might cause the power controller and the sub-battery to collide with each other at the time of the collision of the automobile.

Next, several features of the technology disclosed in the present specification will be described. According to one aspect of the teaching disclosed in the present specification, the power controller and the battery are positioned such that the battery is more likely to break down than the power controller when the power controller and the battery collide with each other. According to an embodiment disclosed in the present specification, the battery and the power controller are positioned such that the battery is positioned forward of the power controller and that a front corner of the power controller faces a flat lateral surface of the battery (a lateral surface of a battery case). Alternatively, the case of the power controller is provided with a protrusion, and the power controller and the battery are positioned such that the protrusion faces the flat lateral surface of the battery. When the corner or protrusion of the power controller collides with the flat lateral surface of the battery, the battery breaks down first. The battery consequently absorbs the impact of the collision, mitigating the damage to the power controller. Note that this feature can be expressed as that the corner or protrusion of the power controller overlaps with the lateral surface of the battery in a lateral view of the automobile.

In a preferred aspect of the technology disclosed in the present specification, it is preferred that the corner or protrusion of the power controller faces the flat lateral surface of the battery on an inner side than an outer contour of the lateral surface of the battery. It is further preferred that the corner or protrusion faces an approximate center of the flat lateral surface of the battery. The region on the inner side of the contour of the lateral surface of the battery has a lower strength than the contour portion, and the center of the lateral surface has the lowest strength. When the corner or protrusion abuts against the low-strength region of the battery (battery case), the battery breaks down easily, but the power controller does not break down easily. This feature can be expressed as that the lateral surface of the battery has a first strength region and a second strength region having a lower strength than the first strength region, and that the corner or protrusion of the power controller faces the second strength region. In another example, the first strength region is a metal frame, whereas the second strength region is a plastic battery case.

When a plurality of corners or protrusions face the lateral surface of the battery, it is preferred that the foremost corner or protrusion overlaps the lateral surface of the battery in the lateral view of the automobile. Here, the term "the foremost corner or protrusion" means the corner or protrusion that is positioned closest to a front end of the automobile, among the plurality of corners or protrusions facing the lateral surface of the battery. This is because the foremost corner (protrusion) among of the plurality of corners or protrusions facing the lateral surface of the battery comes into contact with the lateral side relatively strongly at the time of the collision of the automobile. It is also preferred that the corner positioned at a front upper part of the power controller faces the lateral surface of the battery. Here, the term "front upper part" means an upper part closer to the front end of the vehicle.

In order to cause the battery to absorb the impact of the collision, it is preferred that the battery be positioned outside of the power controller in an automobile lateral direction. In other words, it is preferred that the battery be positioned farther than the power controller from a center line of the automobile. Positioning the battery outside the power controller can place the battery between the power controller and an obstacle with which the automobile collides. According to such a layout, when the automobile collides with the obstacle, it is highly likely that the battery is subjected to impact before the power controller is. In other words, in such a layout, the battery can serve as a cushioning material for mitigating the damage to the power controller. Hereinafter, preferred embodiments of the technology disclosed in the present specification will be described with reference to the drawings.

(First Embodiment)

Figure 1:
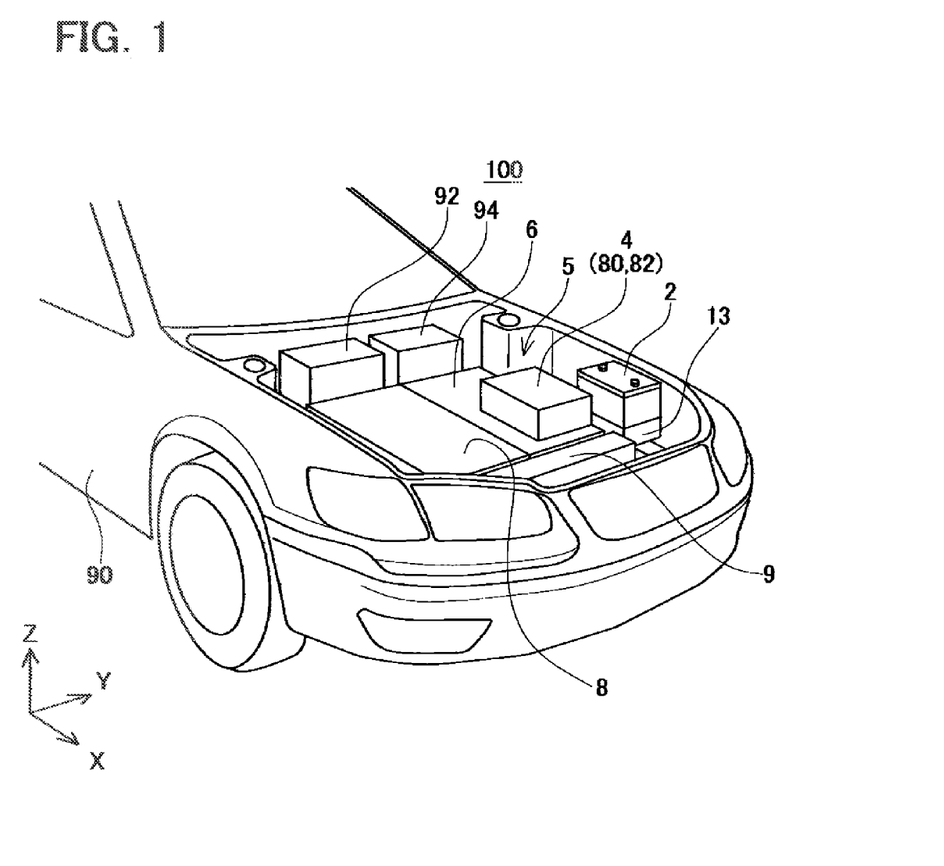
FIG. 1 is a schematic perspective view showing a device layout inside a front compartment.
Figure 2:
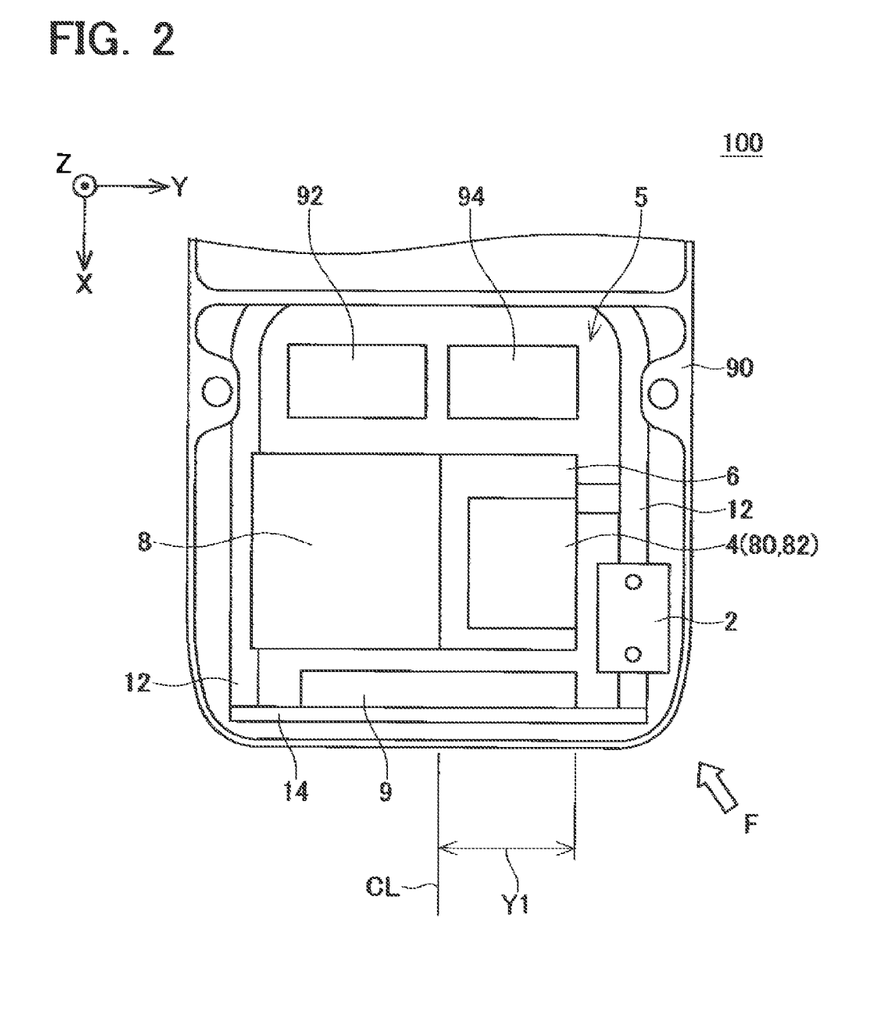
FIG. 2 is a schematic plan view showing the device layout inside the front compartment.

FIGS. 1 and 2 are a schematic perspective view and a schematic plan view, respectively, showing an example of a device layout inside a front compartment 5 of a vehicle 100 according to a first embodiment. Note in all of the diagrams that an X-axis corresponds to the front side of the vehicle, a Y-axis to a lateral direction of the vehicle, and a Z-axis an upper side (vertically upper side) of the vehicle.

First, a group of devices mounted in the front compartment are described. The vehicle 100 is a hybrid vehicle provided with an engine and a motor. The primary devices mounted in the front compartment 5 are an engine 8, a drive-train 6 including a motor, a planetary gear, and a differential gear, a sub-battery 2, a radiator 9, and a power controller 4. In addition, reference numeral 92 represents a relay box, and 94 an air-conditioner compressor. The engine 8 and the drive-train 6 are fixed to a side frame 12 (side member) configuring a frame of the vehicle. The radiator 9 is fixed to a front frame 14 (front bumper reinforcement) configuring a part of the frame. A body 90 of the vehicle is supported by the side frame 12 and the front frame 14. The sub-battery 2 is fixed to the side frame 12, with a spacer 13 therebetween.

The sub-battery 2 provided inside the front compartment 5 outputs voltage of 12 V. The sub-battery 2 supplies electric power to an air conditioner, windshield wiper, headlamp, and electric circuit of the power controller 4. The main battery that supplies electric power for driving the motor is positioned, not in the front compartment 5, but in a rear compartment (luggage room) or under a rear seat. The output of the main battery exceeds 50 V (the output voltages of most main batteries are approximately 200 V). Generally, the sub-battery 2, which supplies the electric circuit or a power steering with low-voltage electric power (voltage of approximately less than 50 V) different from high-voltage electric power (voltage exceeding 50 V) supplied to a motor (vehicle drive motor), is often referred to as an "accessory battery" or "auxiliary battery".

The vehicle 100 is a hybrid vehicle and has a motor generator, planetary gear, and differential gear in the drive-train 6. The planetary gear switches the output of the engine and the output of the motor, or adds up both outputs and transmits them to the differential gear. The drive-train 6 is often referred to as "power train" or "transaxle".

The power controller 4 for controlling the motor provided in the drive-train 6 is fixed to a top surface of the drive-train 6. This positioning has the advantage of reducing the length of a high-voltage conducting wire that connects the power controller 4 and the motor in the drive-train 6 to each other. The power controller 4 transforms the voltage supplied from the main battery, converts the resultant voltage into an alternate current, and supplies it to the motor. In other words, the power controller 4 is provided with a DC/DC converter and an inverter. The power controller 4 is further provided with a function for converting braking energy into electric energy, the braking energy being obtained when a brake is applied. Electric power obtained from the braking energy is referred to as "regenerative energy". The regenerative energy is stored in the main battery.

A capacitor 80 for smoothing a DC/DC converter output and inverter output is embedded in the power controller 4. Normally, such a capacitor has a capacitance of 100 farads or more. The power controller 4 further has an emergency discharge circuit 82 for discharging the capacitor 80 when detecting the collision impact.

An electronic circuit inside the power controller 4 is driven at a voltage of 12 V supplied from the sub-battery 2. As described above, however, high-voltage/power is also supplied from the main battery to the power controller 4. In other words, the power controller 4 is a device that uses voltage higher than the maximum allowable voltage of the sub-battery 2. The power controller 4 is a type of high-voltage device handling a voltage exceeding 50 V, and the sub-battery 2 is a type of low-voltage device handling a voltage of less than 50 V.

The layout of the power controller 4 and the sub-battery 2 is one of the features of the vehicle 100. As shown in FIG. 2, the sub-battery 2 and the power controller 4 are positioned side by side in the automobile lateral direction. The sub-battery 2 is positioned farther than the power controller 4 from a center line CL of the vehicle 100. In other words, the sub-battery 2 is positioned on the outside of the power controller 4 in the vehicle lateral direction. Reference symbol Y1 shown in FIG. 2 represents the position on the outermost side of the power controller 4 in the lateral direction from the center line CL. The sub-battery 2 is positioned on the outside of the position Y1 indicating the outermost side of the power controller 4 in the vehicle lateral direction.

Figure 3:
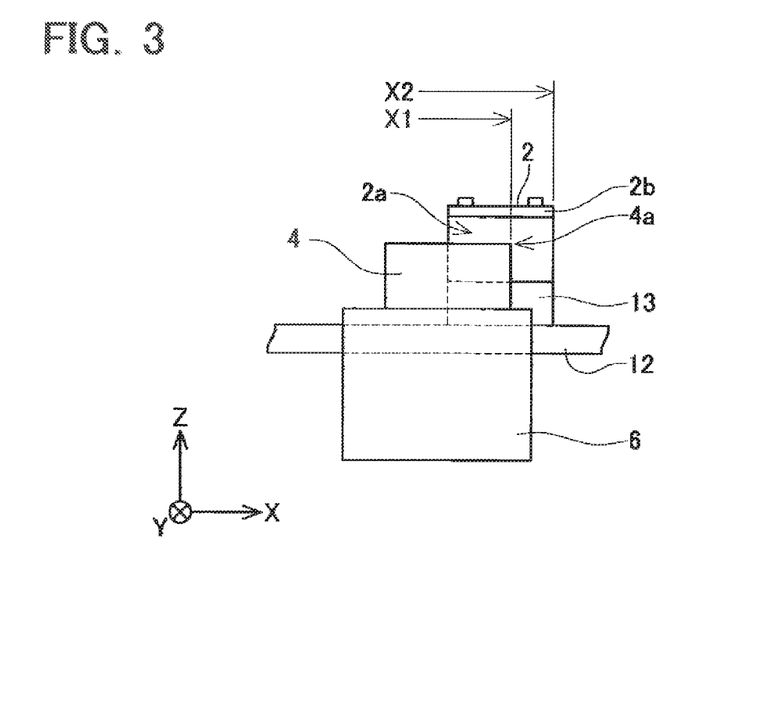
FIG. 3 is a lateral view showing a layout of a power controller and sub-battery.
Figure 4:
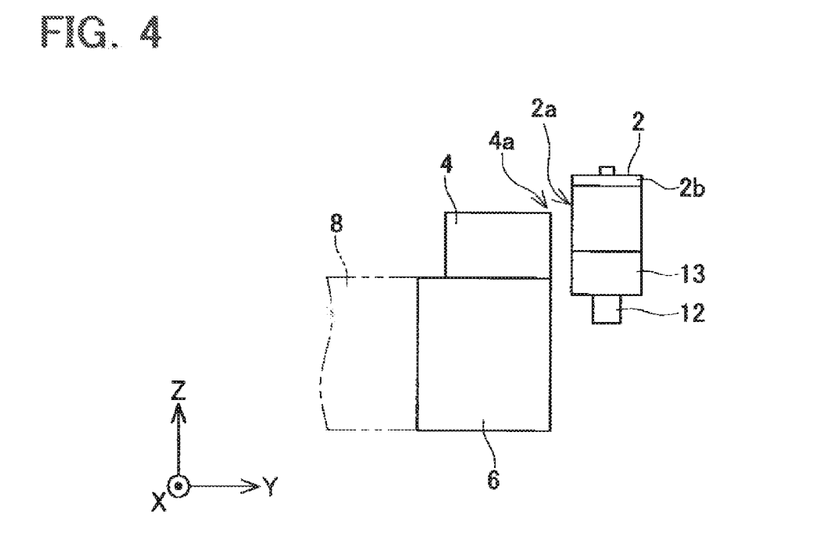
FIG. 4 is a front view showing the layout of the power controller and sub-battery.

FIG. 3 shows the layout of the power controller 4 and the sub-battery 2 viewed in the lateral direction (in the Y-axis direction). FIG. 4 shows the layout viewed from the front (in the X-axis direction). Reference symbol X1 shown in FIG. 3 represents the position at the foremost end of the power controller 4, and reference symbol X2 represents the position at the foremost end of the sub-battery 2. As shown in FIG. 3, the position X2 at the foremost end of the sub-battery 2 is located before the position X1 at the foremost end of the power controller 4. Also, the position X1 at the foremost end of the power controller 4 is located behind the foremost end of the drive-train 6.

As is clear from FIGS. 3 and 4, the power controller 4 and the sub-battery 2 are positioned such that a front corner 4a of the power controller 4 faces an approximate center of a lateral surface 2a of the sub-battery 2. In other words, as is clear from FIG. 3, when viewing the vehicle in the lateral direction (in the Y-axis direction), the front corner 4a of the power controller 4 overlaps with the lateral surface 2a of the sub-battery 2. Note that the sub-battery 2 is supported by the side frame 12, with the spacer 13 therebetween. The height of the sub-battery 2 is adjusted depending on the height of the spacer 13 such that the corner 4a is positioned roughly in the center of the lateral surface 2a.

The sub-battery 2 is entirely covered with a plastic case, and a lateral surface of the case is flat. A metal frame 2b is attached to an upper part of the sub-battery 2. The metal frame 2b has a higher strength than the case. The lateral surface of the sub-battery 2 has a first strength metal frame region and a second strength case region having a lower strength than the first strength metal frame region. The corner 4a faces the case region.

Figure 5:
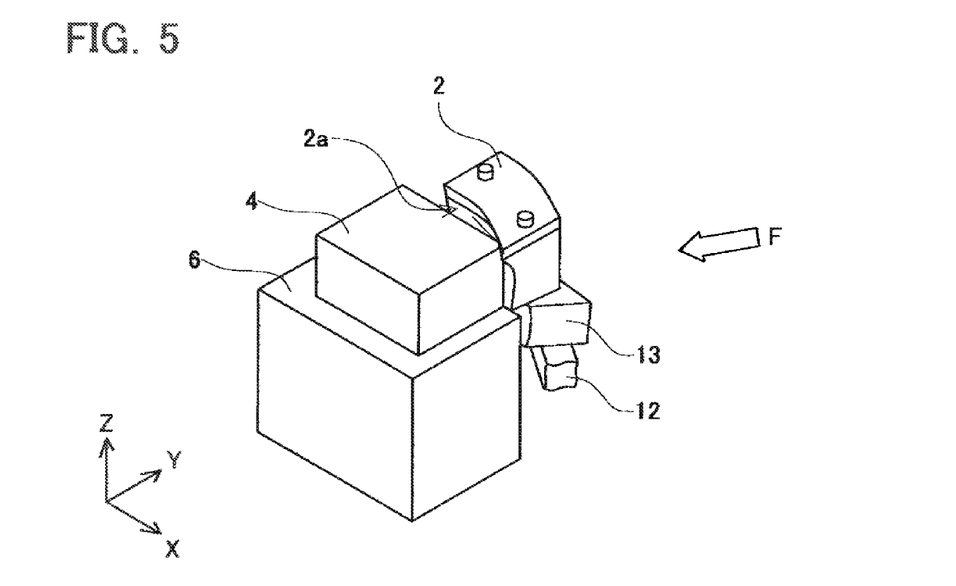
FIG. 5 schematically shows a positional relationship between the power controller and the sub-battery obtained immediately after a collision.

Advantages of the layout of the power controller 4 and the sub-battery 2 are now described. The layout described above mitigates damage suffered by the power controller 4 when the vehicle collides with an object (obstacle). FIG. 5 shows a positional relationship between the power controller 4 and the sub-battery 2 obtained immediately after a collision. FIG. 5 assumes a case in which the obstacle collides with the vehicle in a direction shown by an arrow F. The direction of the arrow F is the same as a direction shown by an arrow F in FIG. 2. As shown in FIG. 2, this situation assumes that the obstacle collides with the vehicle obliquely from the front. When the obstacle collides with the vehicle in the direction of the arrow F, the sub-battery 2 becomes sandwiched between the power controller 4 and the obstacle. Moreover, when the obstacle collides with the vehicle in the direction of the arrow F, the approximate center of the lateral surface 2a of the sub-battery 2 collides with the corner 4a of the power controller 4. The corner 4a is structurally stronger than the flat lateral surface 2a. In addition, the case of the sub-battery 2 is made of resin and the case of the power controller 4 is made of metal (aluminum). The material (metal) of the case of the power controller 4 has a higher strength than the material of the case of the sub-battery 2. Therefore, the lateral surface 2a of the sub-battery 2 is dented by a collision impact, as shown in FIG. 5. Such deformation of the sub-battery 2 absorbs the collision impact, mitigating the damage suffered by the power controller 4.

When the impact (or acceleration) of equal to or greater than a threshold value is applied, the power controller 4 activates the emergency discharge circuit 82 to discharge the capacitor 80. Note that the emergency discharge circuit 82 has a small electric storage element and therefore can be activated even when the supply of electric power from the sub-battery 2 is interrupted. Because the impact suffered by the power controller 4 can be mitigated as described above, the possibility of breakage of the power controller 4 upon collision can be reduced. Furthermore, even in the case of a severe collision, the sub-battery 2 functioning as the cushioning material can secure a small amount of time before the power controller 4 breaks down. As long as the power controller 4 can survive even for the short period of time, the emergency discharge circuit 82 can be activated before the power controller 4 breaks. In other words, the layout described above contributes to improvement of collision safety of the high-voltage device.

Note that, when the obstacle collides with the vehicle from the front, the sub-battery 2 moves rearward without interfering with the power controller 4. A tip end of the drive-train 6 collides with the obstacle before the power controller 4 does. In this case, the drive-train 6 mitigates the damage suffered by the power controller 4.

(Second Embodiment)

Figure 6:
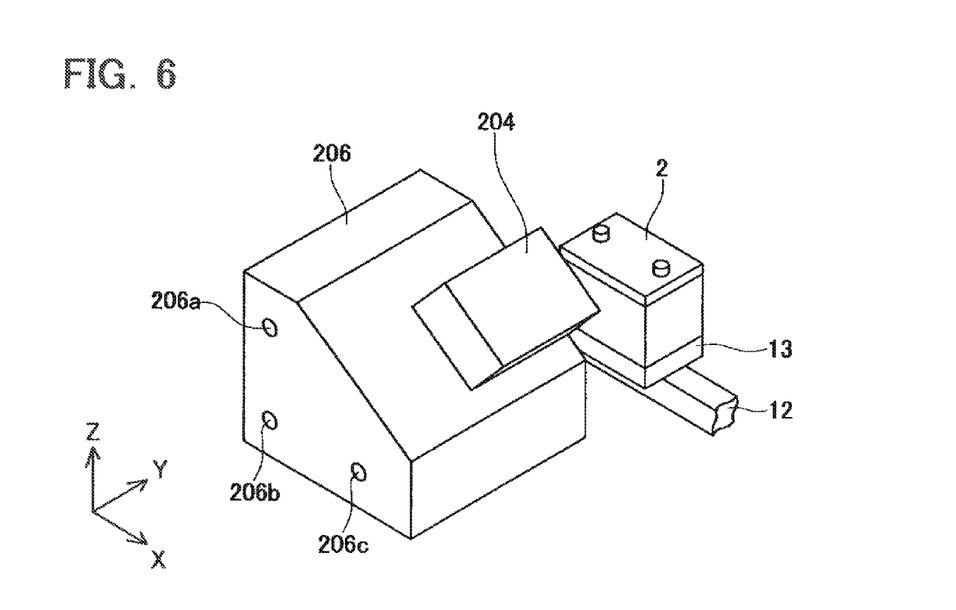
FIG. 6 shows a layout of a power controller and sub-battery according to a second embodiment (perspective view)
Figure 7:
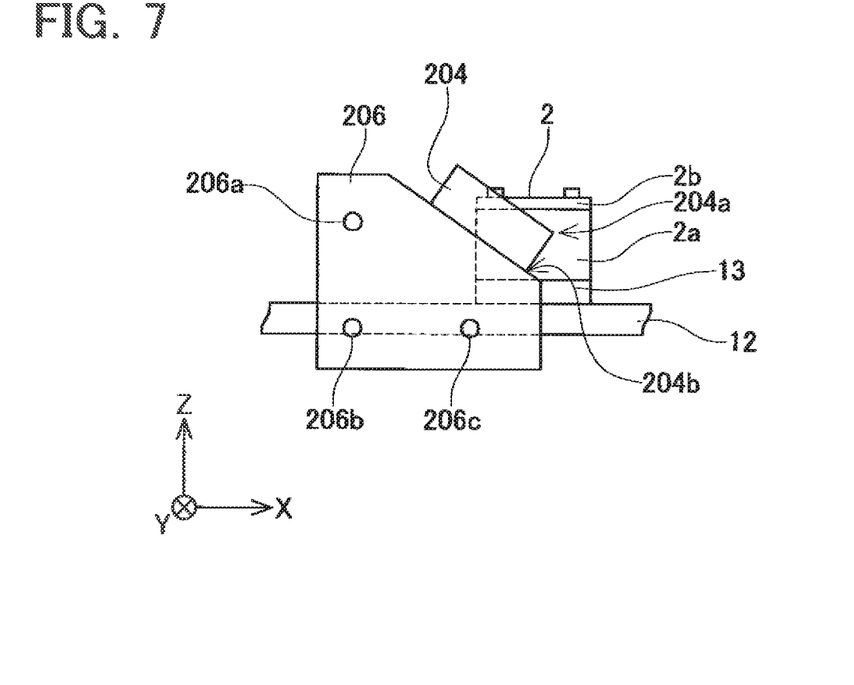
FIG. 7 shows the layout of the power controller and sub-battery according to the second embodiment (lateral view)
Figure 8:
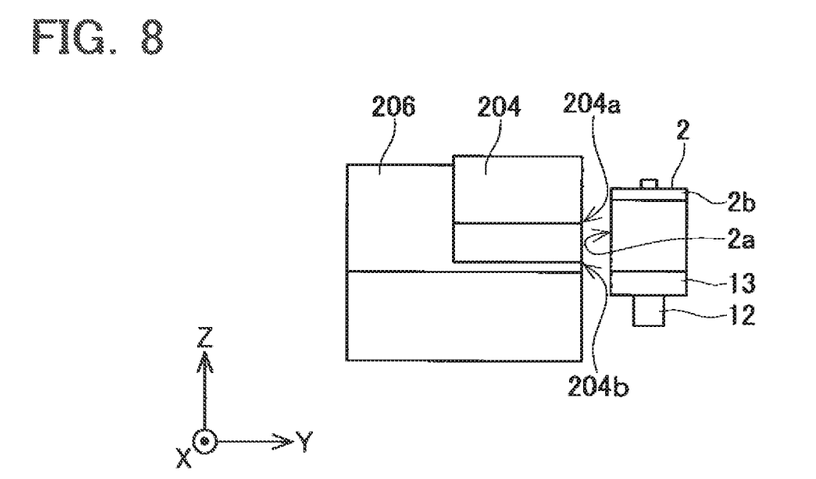
FIG. 8 shows the layout of the power controller and sub-battery according to the second embodiment (front view)

A second embodiment is different from the first embodiment in terms of the shape of the drive-train and the layout of the power controller. The configurations besides those of a drive-train 206 and a power controller 204 are the same as those described in the first embodiment; thus, the illustrations of configurations described in the second embodiment corresponding to FIGS. 1 and 2 are omitted. FIG. 6 is a perspective view showing a layout of the drive-train 206, the power controller 204, and the sub-battery 2 according to the second embodiment. FIGS. 7 and 8 are a lateral view (viewed in the Y-axis direction) and a front view (viewed in the X-axis direction) of the layout, respectively.

The drive-train 206 according to the second embodiment is a hybrid transaxle, so-called "multi-shaft type." This drive-train 206 has two motors (or motor generators) and differential gear built therein. Main shafts 206a, 206b of the two motors and a shaft 206c of the differential gear extend parallel to each other. As is clear from the coordinate systems shown in FIGS. 6 and 7, the drive-train 206 is positioned in a manner that the shafts 206a, 206b, and 206c thereof extend in the lateral direction of the vehicle (Y-axis direction). As shown in FIG. 7, the drive-train 206 has a top surface tilted forward and downward, when viewed laterally. This forward/downward top surface is specific to a multi-shaft drive-train with three shafts 206a, 206b, and 206c.

The power controller 204 is fixed to the forward/downward tilted top surface. In other words, the power controller 204 is tilted forward such that the front thereof is lower than the rear. As is clear from FIGS. 6 to 8, in the second embodiment, two front corners 204a, 204b of the power controller 204 face the lateral surface 2a of the sub-battery 2. Of these two corners, the foremost corner 204a (front upper corner 204a) faces the approximate center of the lateral surface 2a of the sub-battery 2. Note that the term "foremost corner" means the corner or protrusion of the plurality of corners facing the sub-battery 2 that is positioned closest to the front end of the vehicle. At the time of the collision, of the corners facing the sub-battery 2, the foremost corner 204a comes into contact with the flat lateral surface 2a of the sub-battery 2 first. At that moment, the foremost corner 204a comes into contact with the softest center of the lateral surface 2a of the sub-battery 2. As a result, the sub-battery 2 breaks down. In the layout described in the second embodiment as well, the sub-battery 2 functions as a cushioning material at the time of the collision to mitigate damage to the power controller 204. It should be noted that the foremost corner 204a of the power controller 204 faces the flat lateral surface 2a but does not face the frame 2b, which is harder than the lateral surface 2a. Especially the positional relationship in which the power controller 204 is tilted forward and downward and the front upper corner 204a faces the flat lateral surface 2a of the sub-battery 2, has the advantage that the corner 204a can break the lateral surface 2a easily because the corner 204a comes into point-contact with the lateral surface 2a. The term "front upper corner of the power controller" means an upper corner of the power controller that is positioned close to the front end of the vehicle.

(Third Embodiment)

Figure 9:
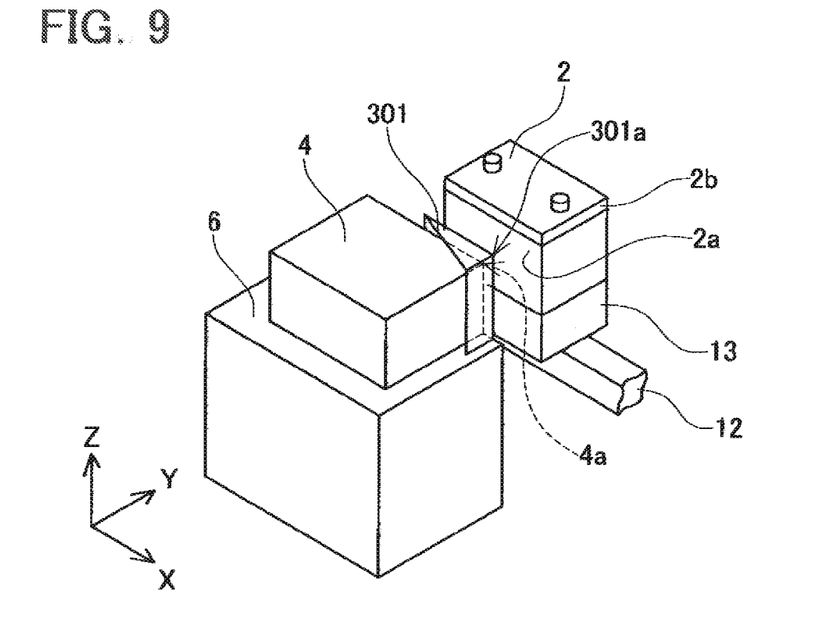
FIG. 9 shows a layout of a power controller and sub-battery according to a third embodiment (perspective view)

A third embodiment is different from the first embodiment in that a protector 301 is added to the power controller 4 of the first embodiment. A vehicle described in the third embodiment is the same as that of the first embodiment without the protector. Thus, the illustrations of configurations described in the third embodiment corresponding to FIGS. 1 and 2 are omitted. FIG. 9 is a perspective view showing a layout of the drive-train 6, the power controller 4, and sub-battery 2 according to the third embodiment. As shown in FIG. 9, the power controller 4 has the protector 301 facing the sub-battery 2. The protector 301 is made of a metal plate. The protector 301 covers the corner 4a of the power controller 4. The protector 301 is positioned such that a protector corner 301a corresponding to the power controller corner 4a faces the lateral surface 2a of the sub-battery 2. In the layout according to the third embodiment, the corner 301a comes into contact with the lateral surface 2a at the time of a collision. When an impact force generated in the collision is intense, the corner 301a breaks the sub-battery 2. Breakage of the sub-battery 2 can mitigate damage suffered by the power controller 4. The protector 301 is fixed to the case of the power controller 4. Providing the protector 301 to the power controller 4 increases the thickness of the case of the power controller 4. Therefore, it should be noted that the protector 301 can be considered as a part of the case of the power controller. In other words, the corner 301a of the protector 301 corresponds to the corner of the case of the power controller.

(Fourth Embodiment)

Figure 10:
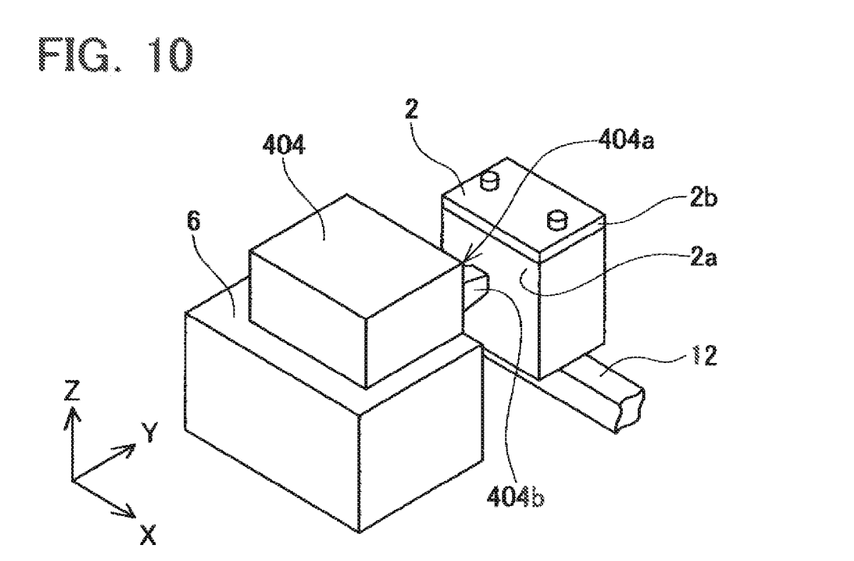
FIG. 10 shows a layout of a power controller and sub-battery according to a fourth embodiment (perspective view)
Figure 11:
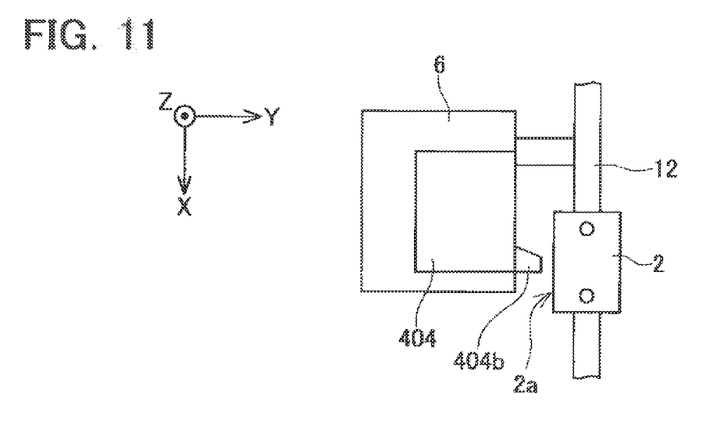
FIG. 11 shows the layout of the power controller and sub-battery according to the fourth embodiment (plan view)
Figure 12:
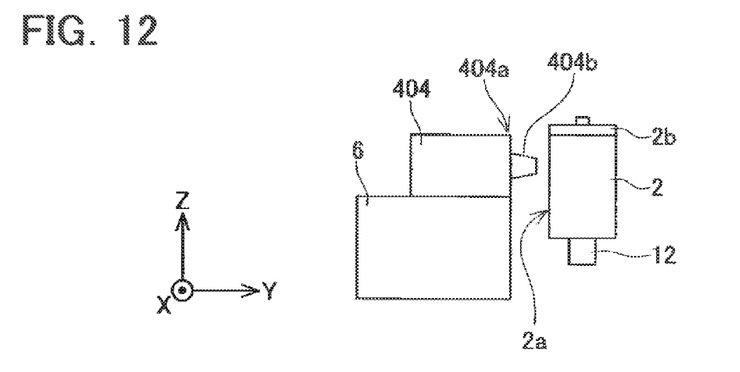
FIG. 12 shows the layout of the power controller and sub-battery according to the fourth embodiment (front view)
Figure 13:
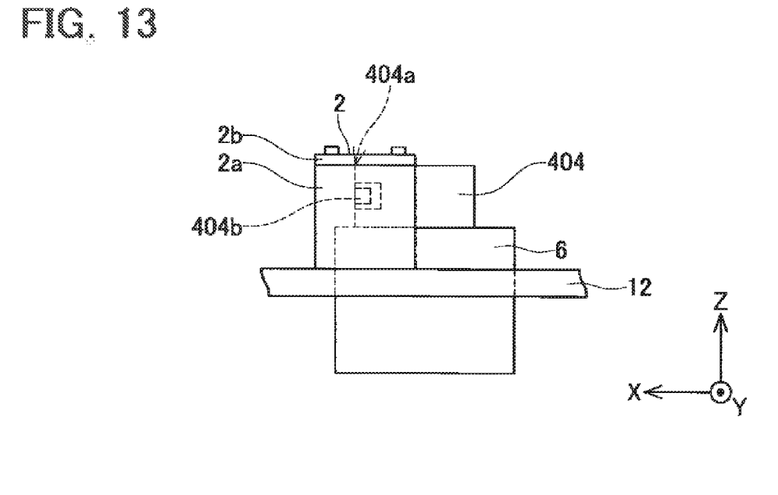
FIG. 13 shows the layout of the power controller and sub-battery according to the fourth embodiment (lateral view)

In a fourth embodiment, a protrusion is provided outside the case of the power controller. FIG. 10 is a perspective view showing a layout of a power controller 404 and the sub-battery 2 according to the fourth embodiment. FIGS. 11, 12, and 13 show a plan view, front view, and lateral view of the layout, respectively. The power controller 404 has a protrusion 404b facing the lateral surface 2a of the sub-battery 2. The protrusion 404b is provided on a lateral surface of the power controller 404. As is clear from FIGS. 11 to 13, the protrusion 404b extends toward the approximate center of the lateral surface 2a. Note that the sub-battery 2 is fixed to the side frame 12, without the spacer 13 of the first embodiment therebetween. This is because the height of the center of the lateral surface 2a needs to be aligned with the height of the protrusion 404b. In the layout according to the fourth embodiment, the protrusion 404b comes into contact with the center of the lateral surface of the sub-battery 2 at the time of the collision. When the impact force generated in the collision is intense, the protrusion 404b breaks the sub-battery 2. The sub-battery 2 breaks down before the power controller 404 does, at the time of the collision of the vehicle. The sub-battery 2 functions as a cushioning material to mitigate damage suffered by the power controller 404.

In the fourth embodiment, a front upper corner 404a of the power controller 404 faces the metal frame 2b of the sub-battery 2. The corner 404a may not be able to break the frame 2b. The protrusion 404b collides with the soft part (center) of the lateral surface of the sub-battery and thereby breaks the sub-battery 2.

(Fifth Embodiment)

Figure 14:
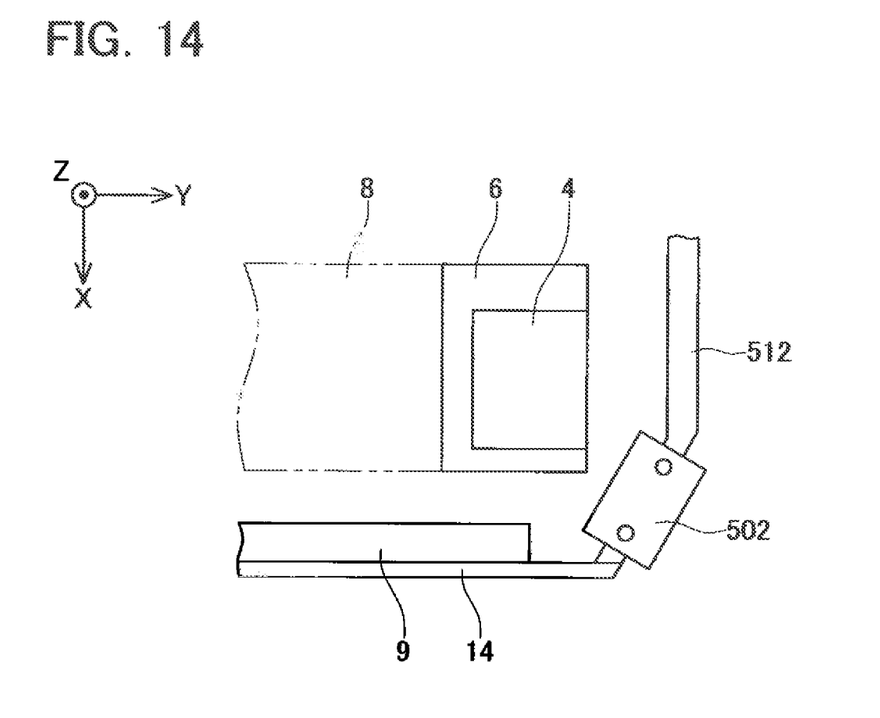
FIG. 14 shows a layout of a power controller and sub-battery according to a fifth embodiment (plan view).

FIG. 14 shows a layout of the power controller 4 and a sub-battery 502 according to a fifth embodiment (plan view). The sub-battery 502 is fixed to a bent side frame 512. In the layout shown in FIG. 14, part of the sub-battery 502 is positioned lateral to the power controller 4, and the rest of the sub-battery 502 is positioned in front of the power controller 4. The expression, "the power controller and the device are positioned side by side along an automobile lateral direction in a front compartment," includes a layout shown in FIG. 14 in which a part of the device (sub-battery 502) is positioned lateral to the power controller 4 and the rest of the device is positioned in front of the power controller 4.

Tips regarding the technology disclosed in the present specification are now described. The sub-battery according to each embodiment corresponds to the example of "the device other than the power controller." The term "the device other than the power controller" is not limited to the sub-battery. For instance, a relay box or an air-conditioner compressor can be a candidate for "the device other than the power controller."

Nonetheless, the battery (sub-battery) is suitable as "the device" in the technology disclosed in the present specification. This is because the battery has a flat lateral side and has its case made of resin.

The power controller is not limited to a power controller that has the emergency discharge circuit that discharges the capacitor when an impact or acceleration exceeds a predetermined threshold value. For example, a power controller for a fuel cell vehicle might have an emergency circuit that discharges a fuel cell or stops the supply of fuel to the fuel cell when the impact or acceleration exceeds the predetermined threshold value. The technology disclosed in the present specification is suitably applied to a fuel cell vehicle.

The shape of the power controller is not limited to a rectangular cuboid. The shape of the device (battery) also is not limited to a rectangular cuboid. The power controller or the device may have a columnar shape, as with, for example, the motor case. Various types of concavities and convexes may be formed on the case of the power controller. Any outer shape may be adopted as long as the corner or protrusion of the power controller faces the flat lateral surface of the device.

The power controller according to each embodiment has a large capacitor (a capacitance with a total of approximately 100 farads or more) built-in. In some cases the capacitor is provided on the outside of the power controller as a separate unit. In such a case, the power controller and the capacitor are connected to each other by a cable. The emergency discharge circuit of the power controller sends a signal for discharging the capacitor, through the cable. The capacitor or fuel cell that is discharged in an emergency is one type of "electric storage device."

The representative and non-limiting embodiments of the present invention were described above in detail with reference to the drawings. The detailed description of the present invention is simply intended to show those skilled in the art the details for implementing the preferred embodiments of the present invention and is not intended to limit the scope of the present invention. Additional features and inventions disclosed herein can be used separately or along with other features and inventions in order to provide a further improved front compartment layout.

Moreover, in the broadest sense of the present invention, combinations of the features and steps disclosed in the detailed description above are not always necessary in the implementation of the present invention and are described only when explaining the representative embodiments of the present invention. Furthermore, various features of these representative embodiments and various features described in the independent and dependent claims are not necessarily described as in the embodiments described herein or in the order in which they are recited.

All features described in the present specification and/or claims are intended to be disclosed separately and independently from each other for the purpose of original disclosure as well as for the purpose of restricting the claimed specific matters independent of the compositions of the features described in the embodiments and/or the claims. It is explicitly stated that all value ranges or indications of groups of entities disclose every possible intermediate value or intermediate entity for the purpose of original disclosure as well as for the purpose of restricting the claimed specific matters.

The above has described in detail the embodiments of the present invention; however, the embodiments are merely exemplary and are not intended to be limiting the scope of claims. The technologies described in the claims include variety of examples obtained by modifying or changing the embodiments illustrated above. The technical components illustrated in the present specification or accompanying drawings can be used independently or combined with other components to demonstrate the technical utility, and should not be limited to the combinations of the claims presented at the time of the filing of this application. The technologies illustrated in the present specification or the drawings accomplish a plurality of objectives simultaneously and provide the technical utility simply by achieving one of the objectives.

Reference Signis List

2, 502: Sub-battery; 4, 404: Power controller; 5: Front compartment; 6, 206: Drive-train; 8: Engine; 12, 512: Side frame; 13: Spacer; 14: Front frame; 100: Vehicle; 204: Power controller; 206: Drive train; 301: Protector; 404b: Protrusion

The invention claimed is:

1. An automobile comprising:
a power controller that supplies electric power to a vehicle drive motor and is fixed to a tilted top surface of a drive-train, a front side of the tilted top surface being lower than a rear side; and
a battery configured of a frame having first strength and a plastic case having a second strength which is lower than the first strength;
wherein:
the power controller and the battery are positioned side by side along an automobile lateral direction in a front compartment; and
the power controller and the battery are positioned such that a protrusion provided on a side surface of the power controller is aligned with, in a vertical and a horizontal directions, an approximate center of a lateral surface of the plastic case of the battery.

2. The automobile of claim 1, wherein, a foremost protrusion faces the lateral surface of the battery in a lateral view of the automobile.

3. The automobile of claim 1, wherein the battery is positioned farther than the power controller from a center line of the automobile.

4. The automobile of claim 1, wherein the power controller is a device which uses a voltage higher than a maximum allowable voltage of the battery.

5. The automobile of claim 1, wherein the drive-train is a multi-shaft transaxle in which a main shaft of a first motor, a main shaft of a second motor, and a shaft of a differential gear extend in parallel.

6. The automobile of claim 1, wherein the power controller includes an inverter that supplies alternate current to the vehicle drive motor.

7. The automobile of claim 1, wherein the power controller includes or is connected to a capacitor having a capacitance equal to or more than 100 farads.

8. The automobile of claim 1, wherein the power controller is provided with an emergency discharge circuit which discharges an electric storage device when the power controller is subjected to an impact, the electric storage device being configured to store electric power.

9. The automobile of claim 1, wherein the battery is attached to a side frame of a frame of the automobile.

* * * * *